United States Patent
McMullin

(10) Patent No.: US 8,718,833 B2
(45) Date of Patent: May 6, 2014

(54) AUTOMATED SYSTEMS AND METHODS FOR CONTROLLING LOCALIZED LOAD CONDITIONS TO EXTEND ELECTRICAL DISTRIBUTION SYSTEM COMPONENT LIFE

(75) Inventor: Dale Robert McMullin, Canton, GA (US)

(73) Assignee: General Electric Company, Schenectady, NY (US)

( * ) Notice: Subject to any disclaimer, the term of this patent is extended or adjusted under 35 U.S.C. 154(b) by 543 days.

(21) Appl. No.: 13/183,796

(22) Filed: Jul. 15, 2011

(65) Prior Publication Data

US 2013/0018518 A1  Jan. 17, 2013

(51) Int. Cl.
*G05D 3/12* (2006.01)
*H02J 3/14* (2006.01)
*H02H 3/05* (2006.01)
*G05B 23/02* (2006.01)
*G06F 1/28* (2006.01)

(52) U.S. Cl.
CPC ... *H02J 3/14* (2013.01); *H02H 3/05* (2013.01); *G05B 23/0283* (2013.01); *G06F 1/28* (2013.01)
USPC .......................................................... 700/292

(58) Field of Classification Search
CPC ......... H02J 3/14; H02H 3/05; G05B 23/0283; G06F 1/28
USPC .......................................................... 700/282
See application file for complete search history.

(56) References Cited

U.S. PATENT DOCUMENTS

| 5,568,399 A * | 10/1996 | Sumic ............................ 700/293 |
| 2003/0204777 A1* | 10/2003 | Kojori ............................. 714/14 |
| 2003/0225481 A1* | 12/2003 | Sealing et al. ................. 700/286 |
| 2004/0157113 A1* | 8/2004 | Klang .............................. 429/50 |
| 2007/0059986 A1* | 3/2007 | Rockwell ....................... 439/638 |
| 2010/0145641 A1 | 6/2010 | Bose et al. |
| 2010/0152910 A1* | 6/2010 | Taft ............................... 700/286 |

OTHER PUBLICATIONS

International Search Report issued in connection with PCT/US2012/42600, Jan. 4, 2013.

* cited by examiner

*Primary Examiner* — Mohammad Ali
*Assistant Examiner* — Sivalingam Sivanesan
(74) *Attorney, Agent, or Firm* — Cantor Colburn LLP

(57) ABSTRACT

Controlling localized load conditions to extend electrical distribution system component life includes forming a load-dependent time-to-failure estimate for at least one of the components, creating an operating load to be experienced by the at least one of the components, and generating an instruction that causes power to be diverted away from the at least one of the components when a required power through the at least one of the components exceeds the operating load.

11 Claims, 3 Drawing Sheets

AUTOMATED SYSTEMS AND METHODS FOR CONTROLLING LOCALIZED LOAD CONDITIONS TO EXTEND ELECTRICAL DISTRIBUTION SYSTEM COMPONENT LIFE

BACKGROUND OF THE INVENTION

The subject matter disclosed herein relates to power distribution and, in particular, to controlling localized load conditions in a power distribution network.

Electrical power generation and distribution involves several interrelated systems, each of which includes several components. Power is initially produced in a power plant and then provided to a transmission grid. The transmission grid carries high voltage power to a distribution grid. The pass off from the transmission grid to the distribution grid occurs at a power substation. The power substation includes transformers to step voltage down to a lower level and can include a bus that allows it to split power off into multiple directions on different distribution lines. In some cases, the power substation can also include switches that allow the power substation to disconnect from one or more distribution lines. The distribution lines deliver power, typically through a drum transformer to consumers of power (e.g., a dwelling or place of business). As used herein, the term "component" as used with respect to electrical power and distribution systems includes any transformers, capacitor or inductor banks, switchgear, or the like that may exist in either system.

The above brief description of power generation and distribution illustrates that several different components are included in the transmission and distribution grids. These components have a "sticker" or "name plate" or other physical communication means that displays or conveys the loads the component is designed to handle. As the component ages, the margin between operation limits and design limits narrows, increasing risk. It is desirable to monitor power grid components, such transformers, for state information, which is used to calculate or estimate health, imminent failure, and remaining life. Often little can be done to prevent the failure of the component once predicted, except to plan for repair or replacement.

BRIEF DESCRIPTION OF THE INVENTION

According to one aspect of the present invention, a system for controlling localized load conditions to extend electrical distribution system component life is disclosed. The system of this embodiment includes an asset state collector that receives status information from one or more components of the electrical distribution system and a failure predictor that forms a load-dependent time-to-failure estimate for at least one of the components based on the status information. The system also includes a load manager that creates an operating load to be experienced by the at least one of the components based on the load-dependent time-to-failure estimate, a load flow analyzer that determines other components that effect an amount of load on the at least one of the components and a demand manager that generates a switching instruction that causes at least some power to be diverted away from the at least one of the components to one of the other components when a required power of loads coupled to the at least one of the components exceeds the operating load.

According to another aspect of the present invention, a method of controlling localized load conditions to extend electrical distribution system component life is disclosed. The method of this aspect includes: receiving at a computing device status information from one or more components of the electrical distribution system; forming in the computing device a load-dependent time-to-failure estimate for at least one of the components; creating an operating load to be experienced by the at least one of the components; and generating an instruction that causes power to be diverted away from the at least one of the components when a required power through the at least one of the components exceeds the operating load.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
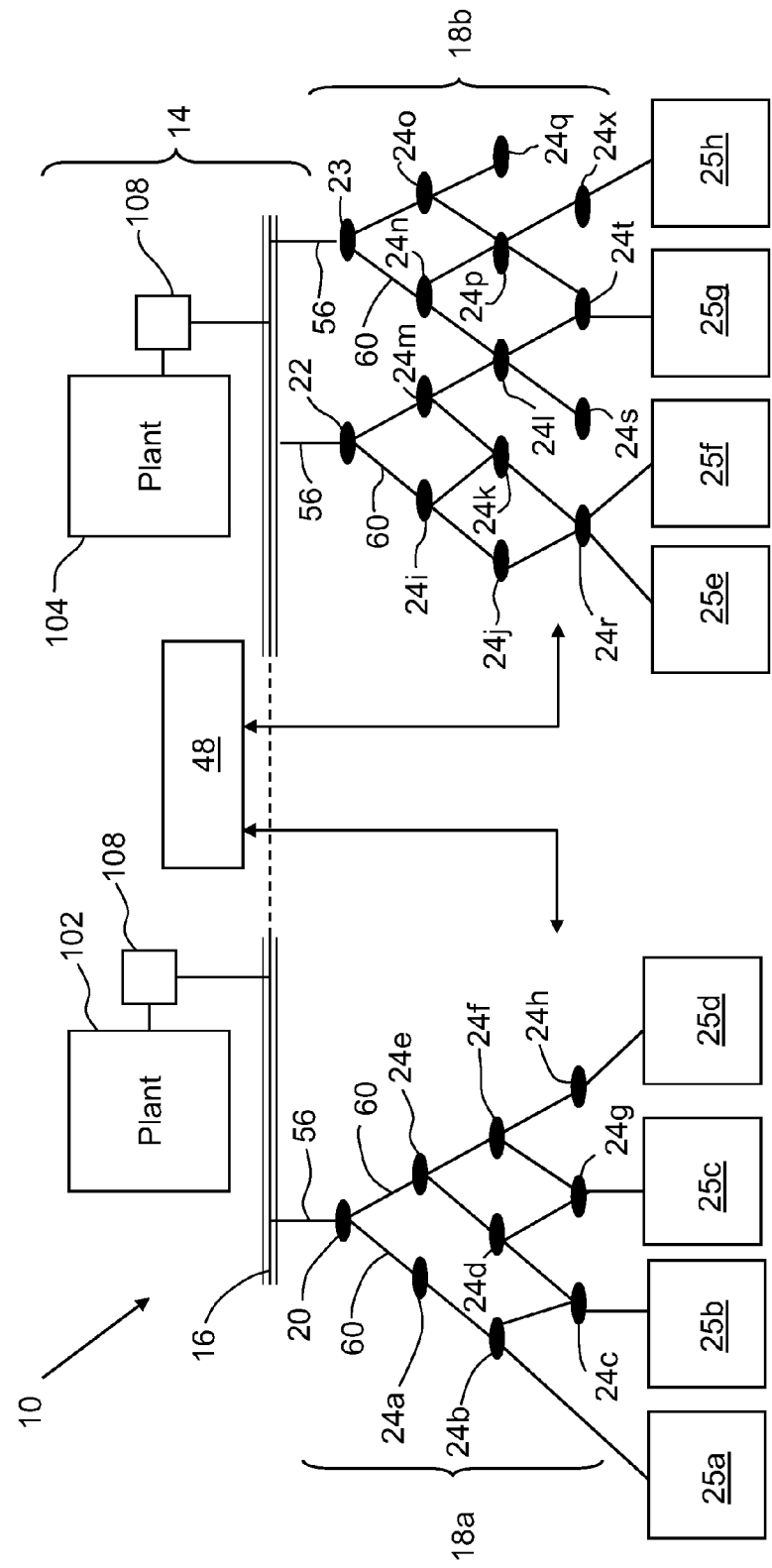
FIG. 1 illustrates a power generation and distribution system.

FIG. 1 illustrates a power generation and distribution system 10. The system 10 includes a production network 14 that includes one or more power plants 102, 104 connected in parallel to a main transmission bus 106 by multiple step-up transformers 108. The power plants 102, 104 may be coal, nuclear, natural gas, incineration power plants or a combination thereof. Additionally, the power plants 102, 104 may include one or more hydroelectric, solar, or wind turbine power generators. The step-up transformers 108 increase the voltage from that produced by the power plants 102, 104 to a high voltage, such as 138 kV for example, to allow long distance transmission of the electric power over the main transmission bus 106. It shall be appreciated that additional components such as, transformers, switchgear, fuses and the like (not shown) may be incorporated into the generation system 10 as needed to ensure the safe and efficient operation of the system.

The system 10 is typically interconnected with one or more other systems to allow the transfer of electrical power into or out of the system 10. At time of high demand, the system 10 can receive electric power from other plants (not shown) to meet the demand. Similarly, at times when demand is below capacity, the system 10 provides electric power to other systems, if needed.

The production network 14 is coupled to one or more distribution networks 18a, 18b. In the illustrated example, the first distribution network 18a is fed by a single feeder line 56 and the second distribution network 18b is fed by two different feeder lines 56. The distribution networks 18a, 18b both form conduction paths between an entry node 20, 22, 23 and one or more consumers 25a-25h of electrical power. In one embodiment, the entry nodes 20, 22, 23 are power substations. As such, the entry nodes 20, 22 can include, for example, transformers to step voltage down to a lower level, a bus that allows it to split power off into multiple directions on different distribution lines 60 and switches that allow it to disconnect from one more distribution lines 60.

The distribution networks 18a, 18b can include one or more switching nodes 24a-24x. The number and configuration of the switching nodes 24 shown in FIG. 1 is merely illustrative. The switching nodes 24 allow an input distribution line 60 to be coupled to one of two or more output distribution lines 60. As one of ordinary skill will realize, the configuration and number of switching nodes 24 can be varied. The terms input and output as used herein refer to the direction of power transmission. That is, power generally enters a node on an input distribution line and leaves it on an output distribution line. Components such as transformers, switches and the like can be located at or near one or more of the switching nodes 24. For ease of explanation, it shall be assumed that one or more components are coupled to the distribution line 60 between at least two of the switching nodes 24.

In one embodiment, the power passing through a particular component can be measured by a monitoring system 48. The monitoring system 48 could be a supervisory control and data acquisition (SCADA) system or part of an advanced metering infrastructure (AMI). In one embodiment, the monitoring system 48 can also cause the switching nodes 24 to open or close in one embodiment. In this manner, the monitoring system 48 can vary the path by which power is provided to a particular consumer 25.

Figure 2:
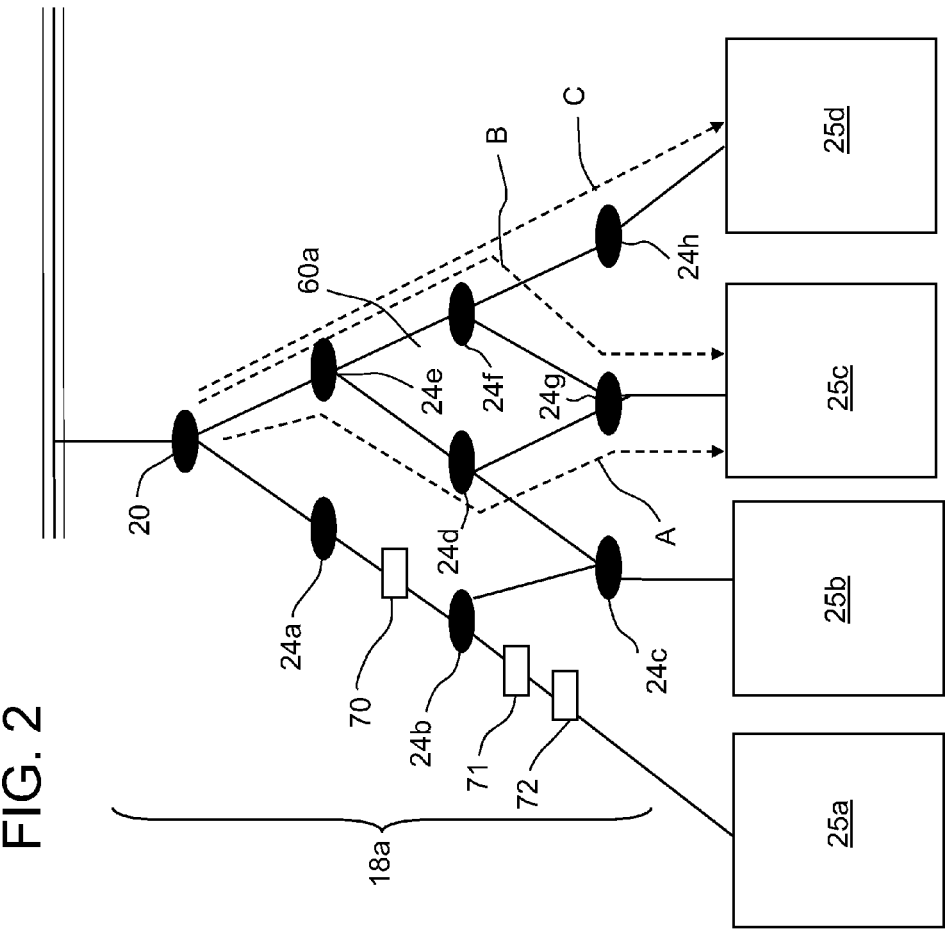
FIG. 2 is detail view of a portion of the system shown in FIG. 1.

For instance, and referring now to FIG. 2, power can be provided to consumer 25c by either path A or path B shown by respective dotted arrow segments A and B, respectively. In particular, path A passes though, in order, switching nodes 24e, 24d and 24g, and path B passes through, in order, switching nodes 24e, 24f and 24g. By varying the configuration of switches in the switching nodes 24, one of these two different paths can be selected. In the illustrated example, consumer 25d can only receive power through path C.

Assume that a component along distribution line 60a cannot safely carry the power required to supply the loads of both consumers 25c and 25d. Embodiments of the present invention can cause at least some of the power required by consumers 25c and 25d to be diverted around that component. In one embodiment, this can be accomplished by providing power to consumer 25c through path A rather than path B. In this manner, the power passing through the switching node 24f (as well as the component on distribution line 60a) can be reduced.

Figure 3:
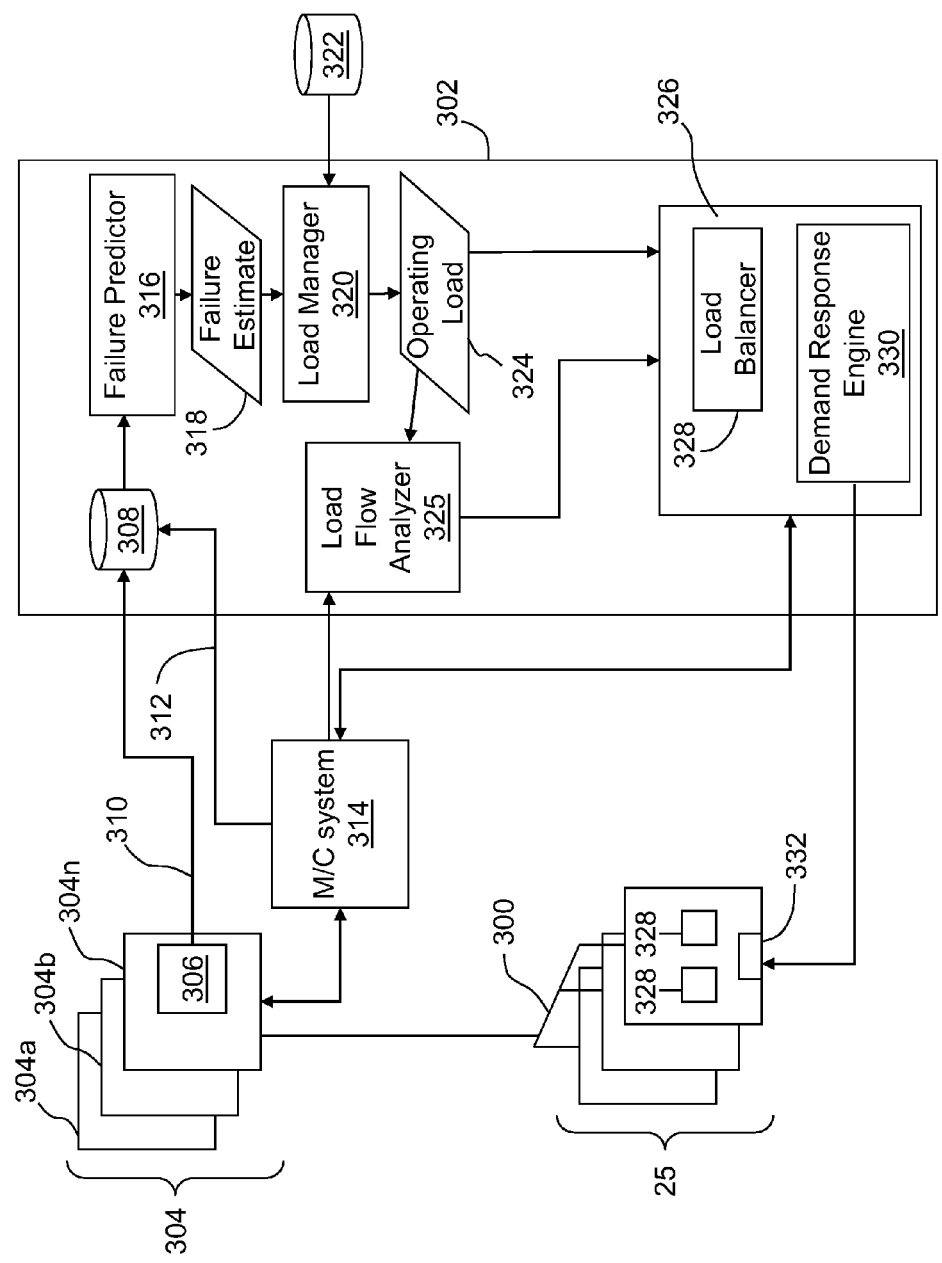
FIG. 3 illustrates a distribution system coupled to a system for controlling localized load conditions to extend electrical distribution system component life.

FIG. 3 illustrates a distribution system 300 coupled to a system 302 for controlling localized load conditions to extend electrical distribution system component life (system). The distribution system 300 includes a plurality of components 304a-304n (collectively, 304). The components can be any type of component utilized in the distribution of electricity including, but not limited to, a transformer, switching gear, a switch, a capacitor bank, and the like. The components 304 can be dispersed around the distribution system 300 at different locations. In one embodiment, the power passing through some or all of the components 304 can be raised or lowered by providing alternate paths through the distribution system 300 as described above, for example.

One or more of the components 304 include a sensor 306 that can measure state information related to the component 304. The state information can be any measurement or diagnostic value that can be utilized to predict a time-to-failure (or that the component 304 has failed) for a particular component 304. For example, if the component 304 is a transformer, the state information could include, for example, temperature, energy conversion efficiency or the results of a diagnostic performed on the transformer.

The sensor 306 communicates the state information to the system 302 where it is stored in an asset state collector such as database 308 that stores the states of assets in the system. The state information can be communicated by a first communication network 310 or a second communication network 312. The first communication network 310 can be private or public network as can the second network 312. The second network 312, however, carries state information that has been collected by a monitoring and control (M/C) system 314 before being transmitted to the asset state collector. An example of an M/C system is a SCADA system.

In one embodiment, the M/C system 314 includes the ability to alter connections in the distribution system 300. That is, the M/C system 314 can be configured to cause one or more switches in the distribution system 300 (e.g., switching nodes 24 of FIGS. 1 and 2) to open or close to vary power delivery paths. Many SCADA systems currently have this ability. None of these systems, however, receive switching instructions (e.g., a network configuration) that are informed by the health of a component 304.

Regardless of where received from, the data in database 308 can be utilized by a failure predictor 316 to produce a failure estimate 318 for one or more of the components 304. The failure predictor 316 can also produce information related to the current conditions at the component for future use. In one embodiment, the failure estimate 318 is load dependent. That is, the failure estimate 318 can provide different failure dates/time based on a particular load value. For example, the failure estimate 318 can include information indicating that a certain transformer may fail sooner if operated at a first operating level than at a second, lower level. Of course, in some cases, the time to failure can be instantaneous in the case where the component has already failed or is about to fail. In such a case, it may be beneficial to divert all power away from the component as soon as possible.

The failure estimate 318 is provided to a load manager 320. The load manager 320 determines an operating load 324 for the component 304 based on a desired failure time. The time can be arbitrary or based on external information such as, for example, when personnel are available to repair or replace the component 304 or time window of a planned outage when repairs/replacements could be made. This information can be received, for example, from a spare part inventory and repair schedule database 322. In such an embodiment, the repair/replacement information allows the load manager 320 to select a particular operating load from the failure estimate 318 that will allow the component 304 to operate until it can be repaired or replaced. For purposes herein, it is irrelevant how the load manager 320 determines the desired failure time. A component for which an operating load 324 is established may be referred to as an "at-risk" component.

In one embodiment, the operating load 324 for one or more at-risk components is provided to a demand manager 326. The demand manager 326, generally, determines the configuration of the distribution system 300 that allows consumers 25 to receive power sufficient to drive loads located at the consumer 25 (e.g., appliances 328) while keeping the power passing through an at-risk component (required power) below the operating load 324 for that component 304. The appliances 328 at a particular consumer 25 can include, for example, a heating, ventilation and air conditioning (HVAC) system, a refrigerator and the like.

The operating load 324 can also be provided to a load flow analyzer 325. The load flow analyzer 325 is coupled to and receives information from the SCADA system 314. In particular, the load flow analyzer 325 can be configured to determine the consumers 25 or other components 304 that are supplied through the at-risk components. That is, the load flow analyzer 325 determines a set of all components 304 (related components) downstream of the at-risk components. Stated in yet another manner, the load flow analyzer 325 determines the set of components 304 that affect the load on the at-risk component. Components 304 satisfying any of the above definitions may be referred to herein as "other components." In some cases, an at-risk component can be an "other component" for a different at risk component. The other components can be or be linked to or other otherwise associated with a switching node 24 (FIG. 1).

The demand manager 326 can optionally include a demand response engine 330. The demand response engine 330 can issue demand response requests to a meter 332 or other device associated with a particular consumer 25 through the meter 332 or through a communication network such as the Internet. The meter 332 or other device (e.g., a home energy management device or application) can receive the request and, if certain conditions are met, defer or halt the operation of one or more of the appliances 328 located therein. In some cases, the results of the demand response request can achieve a reduction in loads such that the required load is less than the operating load 324. In such a case, no further reduction is needed, at least temporarily. Of course, if it is later determined that required power exceeds the operating load 324, additional steps may be taken as described below.

The demand manager 326 also includes a load balancer 328. The load balancer 328 generally determines a configuration for the distribution network 300 based on the operating load 324 and the other components that are supplied through the at-risk components such that the required load does not exceed the operating load 324. In more detail, the load balancer 326 can simulate different configurations of the switching nodes 24 (FIG. 1) to balance the load among them while keeping power through the at-risk components below the operating load 324. Balance can be achieved through timing or grouping of aggregate loads, for example. In order to achieve such balancing, the load balancer 326 can receive either real-time or historical information related to power passing through the related components. After the configuration is determined, the demand manager 326 can issue a switch instruction to the SCADA system 314 that causes it to vary the configuration of switching nodes 24.

In some instances, there may not exist a particular solution where required power can be kept below the operating load for a particular component. In such and other cases, embodiments of the present invention can also utilize so-called volt/var management techniques. In particular, and referring again to FIG. 2, assume that after (or without) the load balancing described above, there is no solution that allows for meeting the required power of consumer 25a without exceeding the operating load assigned to an at-risk component 71. In such a case, one or more voltage/var control devices 70, 72 can be utilized to vary the voltage of the power passing through the component 71. Examples of such devices include, for example, tap changers, voltage regulators and reactive compensation devices (e.g., capacitor or capacitor/inductor banks). In a particular example, the control devices 70, 72 can vary voltage or current of the power passing through the component such that the resistive load of component 71 is reduced below the operating load 324 for the component 70. In one embodiment, the first control device 70 is coupled between node 24a and the at-risk component 71 and the second control device 72 is coupled between the at-risk component 71 and the consumer 25. Of course, the exact location can be varied as will be realized by one of skill in the art based on the teachings herein.

Embodiments of the present invention have a technical effect in that load balancing takes into account desired operation times for at-risk components and, as such, can prolong the life of such components.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for controlling localized load conditions to extend electrical distribution system component life, the system comprising:
   an asset state collector that receives status information from one or more components of the electrical distribution system;
   a failure predictor that forms a load-dependent time-to-failure estimate for at least one of the components based on the status information;
   a load manager that creates an operating load to be experienced by the at least one of the components based on the load-dependent time-to-failure estimate;
   a load flow analyzer that determines other components that effect an amount of load on the at least one of the components;
   a demand manager that generates a switching instruction that causes at least some power to be diverted away from the at least one of the components to one of the other components when a required power of loads coupled to the at least one of the components exceeds the operating load;
   wherein a first sensor coupled to the at least one of the components;
   a second sensor coupled to the one of the other components; and
   the status information is received from the first and second sensors and the switching instruction causes power to be diverted from the at least one of the components to the one of the other components.

2. The system of claim 1, wherein the component health collector stores the status information in a database.

3. The system of claim 1, further comprising:
   a demand response engine that requests that one or more loads supplied by the at least one of the components be shed to reduce the required power.

4. The system of claim 3, wherein the load reduction request manager requests that one or more of the loads coupled by the at least one of the components be shed before the demand manager causes power to be diverted away from the at least one of the components.

5. The system of claim 3, wherein the load reduction request system is part of the demand manager.

6. The system of claim 1, further comprising: a supervisory control and data acquisition (SCADA) system coupled to the demand manager that measures the required power and that controls the manner in which power is distributed in the electrical distribution system based on the switching instruction generated by the demand manager.

7. The system of claim 1, wherein the demand manager includes a load balancer that determines a connection configuration of the one or more components such that the required power does not exceed the operating load.

8. A method of controlling localized load conditions to extend electrical distribution system component life, the method comprising:

receiving at a computing device status information from one or more components of the electrical distribution system;

forming in the computing device a load-dependent time-to-failure estimate for at least one of the components;

creating an operating load to be experienced by the at least one of the components; and generating an instruction that causes power to be diverted away from the at least one of the components when a required power through the at least one of the components exceeds the operating load;

wherein receiving status information from a first sensor coupled to the at least one of the components;

receiving status information from a second sensor coupled to a second component; and the status information is received from the first and second sensors and the instruction causes power to be diverted from the at least one of the components to the second component.

9. The method of claim 8, further comprising:

storing the status information in a database.

10. The method of claim 8, further comprising:

requesting that one or more loads supplied by the at least one of the components be shed to reduce the required power.

11. The method of claim 10, wherein requesting that one or more loads supplied by the at least one of the components be shed to reduce the required power is performed before generating the instruction.

* * * * *